US010005644B2

(12) United States Patent
Vincent et al.

(10) Patent No.: US 10,005,644 B2
(45) Date of Patent: Jun. 26, 2018

(54) MACHINE FOR DRIVING A LIFT

(71) Applicant: MOTEURS LEROY-SOMER, Angouleme (FR)

(72) Inventors: Benoit Vincent, Champniers (FR); Pascal Carriot, La Couronne (FR); Pascal Beynaud, Saint Saturnin (FR)

(73) Assignee: MOTEURS LEROY-SOMER, Angouleme (FR)

( * ) Notice: Subject to any disclaimer, the term of this patent is extended or adjusted under 35 U.S.C. 154(b) by 235 days.

(21) Appl. No.: 14/763,658

(22) PCT Filed: Jan. 22, 2014

(86) PCT No.: PCT/IB2014/058468
§ 371 (c)(1),
(2) Date: Jul. 27, 2015

(87) PCT Pub. No.: WO2014/115089
PCT Pub. Date: Jul. 31, 2014

(65) Prior Publication Data
US 2015/0353325 A1   Dec. 10, 2015

(30) Foreign Application Priority Data

Jan. 25, 2013   (FR) ..................... 13 50673

(51) Int. Cl.
*B66B 11/04*   (2006.01)
*H02K 7/102*   (2006.01)
(Continued)

(52) U.S. Cl.
CPC ............ *B66B 11/04* (2013.01); *B66B 11/043* (2013.01); *H02K 5/1732* (2013.01); *H02K 7/083* (2013.01);
(Continued)

(58) Field of Classification Search
CPC ....... B66B 11/04; B66B 11/043; H02K 11/20; H02K 5/1732; H02K 7/083; H02K 7/1008; H02K 7/102
See application file for complete search history.

(56) References Cited

U.S. PATENT DOCUMENTS 3,559,768 A * 2/1971 Cox .................. B66B 5/027
   187/257
4,960,186 A * 10/1990 Honda ............. B66B 11/0438
   187/254
(Continued)

FOREIGN PATENT DOCUMENTS

EP   543 617 A1   5/1993
EP   1 336 585 A1   8/2003
(Continued)

OTHER PUBLICATIONS

May 14, 2014 Search Report issued in International Patent Application No. PCT/IB2014/058468.

*Primary Examiner* — Michael A Riegelman
(74) *Attorney, Agent, or Firm* — Oliff PLC

(57) ABSTRACT

An electrical machine for driving a pulley, including: a shaft whereon the pulley is mounted; a motor for driving the shaft; at least one brake; a first front bearing for supporting the motor, the first front bearing being arranged on one side of the pulley, carrying a front ball bearing and being supported by at least one damping element; and a second front bearing arranged on the opposite side, carrying at least one ball bearing and supported by at least one damping element. The machine does not contain a rigid connection between the first front bearing for supporting the motor and the second front bearing.

14 Claims, 3 Drawing Sheets

(51) Int. Cl.
*H02K 7/10* (2006.01)
*H02K 7/08* (2006.01)
*H02K 5/173* (2006.01)
*H02K 11/20* (2016.01)

(52) U.S. Cl.
CPC ........... *H02K 7/102* (2013.01); *H02K 7/1008* (2013.01); *H02K 11/20* (2016.01)

(56) References Cited

U.S. PATENT DOCUMENTS

| | | | | |
|---|---|---|---|---|
| 5,844,334 | A * | 12/1998 | Sasaki | H02K 9/04 187/277 |
| 5,944,150 | A * | 8/1999 | Hikari | B66D 5/14 188/156 |
| 6,446,762 | B1 * | 9/2002 | St. Pierre | B66B 7/02 187/406 |
| 8,960,418 | B2 * | 2/2015 | Rathmann | B65G 39/02 198/835 |
| 2002/0100902 | A1 * | 8/2002 | Strbuncelj | B66B 11/043 254/266 |
| 2004/0104079 | A1 * | 6/2004 | Fischer | B66B 7/021 187/254 |
| 2004/0124736 | A1 * | 7/2004 | Gauthier | H02K 1/2786 310/413 |
| 2009/0078510 | A1 * | 3/2009 | Mueller | B66B 11/0438 187/352 |
| 2009/0127949 | A1 * | 5/2009 | Zhang | B66D 5/02 310/77 |
| 2012/0153754 | A1 * | 6/2012 | Vincent | B66D 5/14 310/77 |
| 2017/0121151 | A1 * | 5/2017 | Watanabe | B66B 11/0045 |

FOREIGN PATENT DOCUMENTS

| | | |
|---|---|---|
| JP | 2010-184763 A | 8/2010 |
| WO | 2008/020835 A1 | 2/2008 |
| WO | 2010/126484 A1 | 11/2010 |
| WO | 2012/176287 A1 | 12/2012 |

* cited by examiner

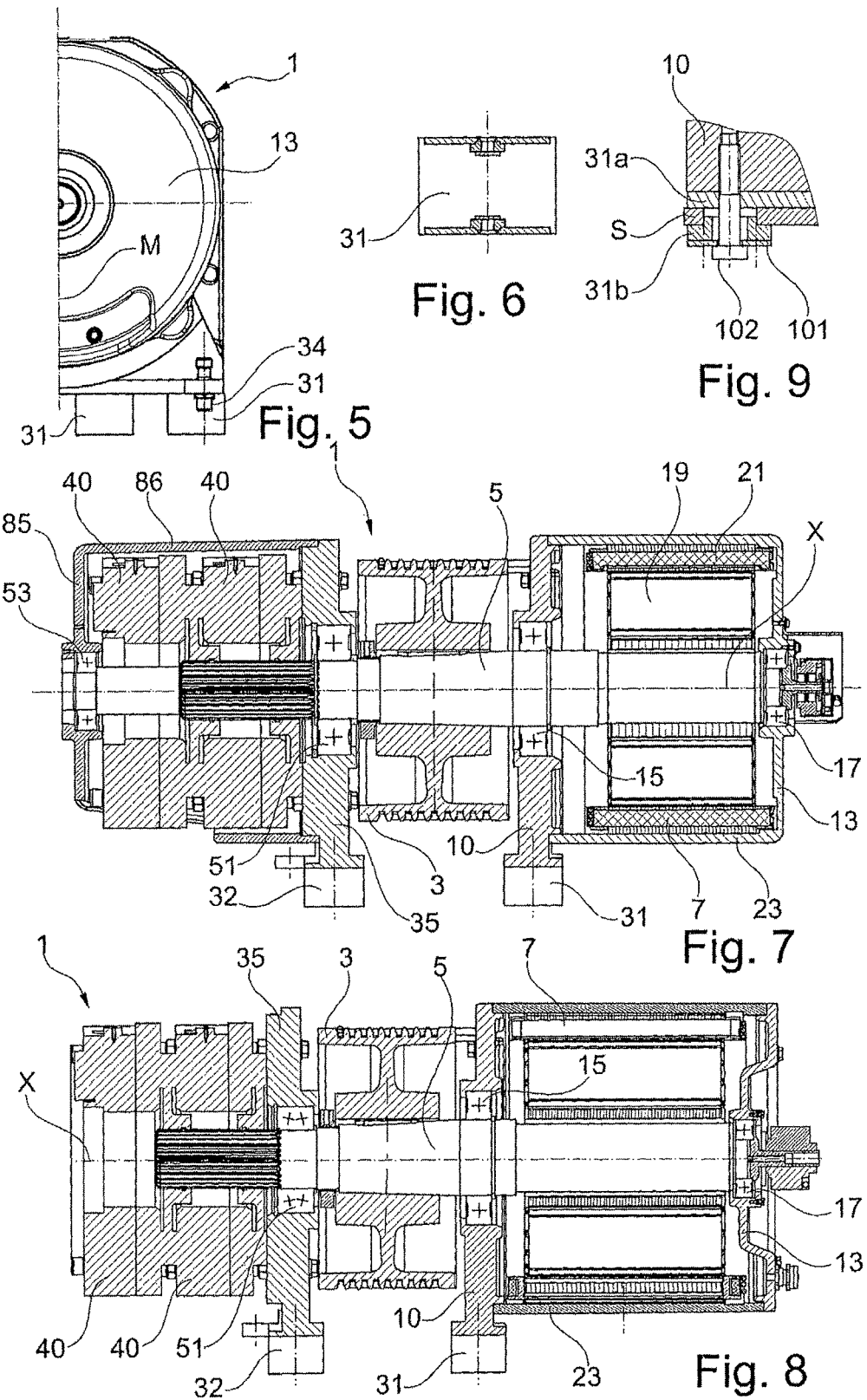

MACHINE FOR DRIVING A LIFT

The present invention concerns electrical machinery notably intended for driving a lift.

Lift driving machinery includes a pulley mounted on a shaft driven by an electric motor and one or more brakes opposing rotation of the shaft in the absence of operation of the motor.

Many designs of lift belt or cable drive machinery have been proposed. As a general rule, the machinery must be as compact as possible in order to enable its installation in small spaces.

Figure 1:
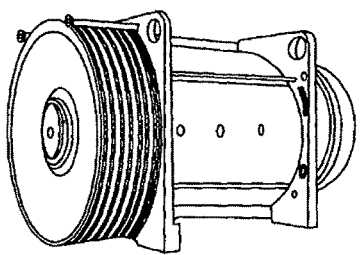

In some machinery, as shown in FIG. 1, the pulley is an external, cantilevered pulley, which implies mounting the motor on a rigid support with uprated rolling bearing and shaft. The brake is near the motor, which makes it sensitive to heating of the latter. Moreover, the motor is difficult to ventilate because it is centrally positioned.

Figure 2:
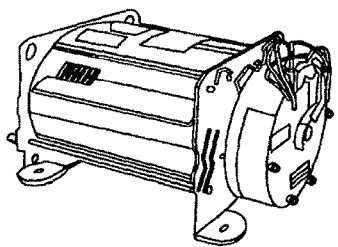

In other embodiments, as shown in FIG. 2, the pulley is internal, with a rigid central casing.

This imposes a relatively small pulley diameter, difficult motor assembly, for example carried out blind, difficulty in controlling the air gap and a rigid central bearing that is difficult to produce with the required precision. Moreover, an installation problem is encountered, the cables or the belt having to be passed through openings in the casing to fit them or remove them.

WO 2010/126484 A1 discloses machinery including a chassis carrying a brake and a motor disposed on opposite sides of a pulley. The bearings fixing the motor and the brake are defined by uprights joined by arms the section of which varies.

EP 543 617 A2 discloses machinery in which the arms that join the bearings are constructed so as to damp operating noise.

US 2002/0100902 A1 discloses machinery in which the pulley is made in one piece with the shaft and lies between bearings. The housings receiving the rolling bearings are of greater diameter than the pulley, in order to enable it to be fitted. The brake and the motor can be disposed on opposite sides or on the same side of the pulley.

The invention aims to propose compact machinery of economic construction and reliable operation, remedying some or all of the drawbacks of known machines.

In one of its aspects, the invention consists in electrical machinery for driving a pulley, including:
- a shaft on which the pulley is mounted,
- a motor for driving the shaft,
- one or more brakes,
- a first front bearing supporting the motor, disposed on one side of the pulley, carrying a front bearing and supported by one or more damper elements,
- a second bearing, disposed on the opposite side, carrying at least one rolling bearing and supported by one or more damper elements,
- in which machinery there is no rigid connection between the first front bearing supporting the motor, and the second front bearing.

Another subject of the invention is electrical machinery for driving a pulley, including:
- a shaft on which the pulley is mounted,
- a motor for driving the shaft disposed on one side of the pulley,
- one or more brakes disposed on the opposite side,
- a front bearing supporting the motor, carrying a front rolling bearing, supported by one or more damper elements,
- a bearing supporting the brake or brakes carrying at least one rolling bearing, supported by one or more damper elements.

The damper element or elements are made of elastomer, for example, optionally reinforced, and allow deformation in compression and/or in shear of the mechanical connection joining the bearing to the base supporting the latter. The damper element or elements supporting the same bearing, for example the second front bearing or the first front bearing supporting the motor, may be damper studs, for example two to five in number, and preferably have their axes situated in the same plane perpendicular to the rotation axis.

The disposition of the damper element or elements enables by deformation thereof some freedom of movement of the second front bearing and the first front bearing supporting the motor, notably tilting about an axis perpendicular to the rotation axis.

The damper element or elements are preferably studs; however, a baseplate made of elastomer may also be used, for example, disposed between the bearing or bearings and the support base.

At the limit, the same baseplate can support both the first front bearing supporting the motor and the second front bearing.

The invention makes it possible to absorb suspension forces as close as possible to the pulley and reduces flexing of the shaft induced by the tension of the cables or the belts that rest on the pulley, which makes it possible to reduce the diameters of the shaft and the rolling bearings.

The invention also makes it possible to avoid the use of a rigid central casing that is complicated to manufacture and would limit the diameter of the pulley.

Another advantage of the invention is that reduced flexing of the shaft facilitates obtaining an air gap of well controlled size on the motor side.

In machinery in accordance with the invention, there is no rigid connection between the first and second support bearings, and when the brake or brakes are supported by the second support bearing according to one of the aspects of the invention, there is no rigid connection between the bearings supporting the motor and supporting the brake or brakes, in contrast to the embodiments described in WO 2010/126484, for example, where the bearings are joined by rigid arms on their facing faces. The presence of the damper element or elements, thanks to their deformability, makes it possible to compensate any misalignment of the bearings disposed on opposite sides of the pulley and to minimize the loads exerted on the rolling bearing. This simplifies assembly of the machinery.

The invention can also facilitate the fitting of a balance for determining the torque exerted on the brake when stopped. As a matter of fact, the balance may be disposed to measure a displacement of the machinery induced by a deformation of the damper element or elements. The balance is for example an inductive sensor disposed so as to be moved as a function of the load to which the damper element or elements are subjected. For example, it is fixed to the bearing so as to be offset optimally from a longitudinal median plane of the machinery; the sensor can detect its movement toward or away from the base supporting the machinery.

Knowing the torque exerted on the brake, the motor can be controlled on starting so as to exert a torque equal to the torque exerted on the brake before releasing the brake, so as to avoid jerks.

Finally, the machinery rests stably in compression on the damper element or elements and there is no tilting moment. This facilitates installation of the machinery by the lift installer.

The damper element or elements are preferably placed substantially in line with the rolling bearings nearest the pulley, so that the radial load is transferred to the support base without loading the additional rolling bearings guiding the shaft.

The invention also makes it possible to avoid mechanical uprating, notably at the level of the rolling bearings and the shaft, for example in relation to the section of the latter and/or the grade of steel used.

Installation of the cables or the belt is facilitated by the absence of problems mounting the latter.

Controlling the dimensions of the air gap of the motor improves comfort by reducing vibrations and noise.

The invention also makes it possible to control better the air gap of the brake or brakes and thus to reduce wear and noise.

The motor may include a rear bearing carrying a rear rolling bearing.

The machine may include a plurality of brakes.

The brake or brakes are preferably supported by the second front bearing.

An advantage of disposing the motor and the brake or brakes on opposite sides of the pulley is reducing the risk of transmission of heat between the motor and the brake. Moreover, it is easier to integrate a fan to cool the motor, given the space available on the motor side.

All the brakes may be disposed on the same side of the second front bearing.

Alternatively, the brake or brakes are supported by the rear bearing.

An advantage of disposing the brake or brakes behind the motor is that it facilitates the transfer of torque from the brake or brakes to the motor during stopping phases.

When the motor and the brake or brakes are disposed on opposite sides of the pulley, the transfer of torque between the motor and the brake, or vice-versa, tends to create an angular offset between the motor and the brake.

The second front bearing may carry a rolling bearing, for example of the two-row type.

The second front bearing preferably includes two separate rolling bearings.

As an alternative, the first front support bearing carries a rolling bearing of the single-row type. This solution is preferable if the brake or brakes are supported by the rear bearing alone, but may also be used if the second front bearing supports the brake or brakes.

As indicated above, the machinery may advantageously include a balance disposed so as to measure the load tending to deform the damper element or elements.

The machinery may have no casing around the pulley.

The first front bearing supporting the motor and the second front bearing preferably rest on a common base. This base can have an opening through it for passing through it cables or a belt engaged on the pulley.

Figure 3:
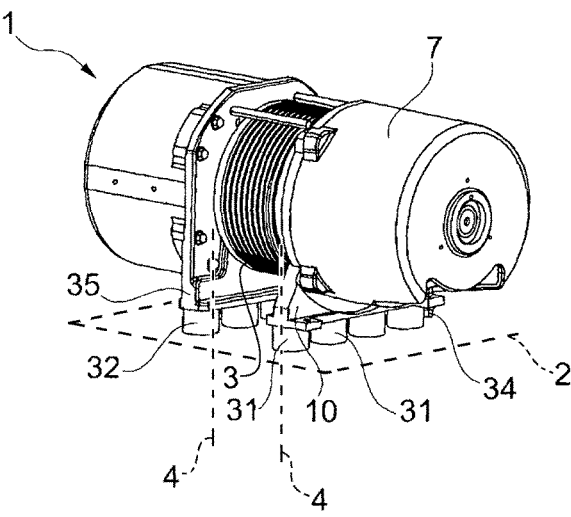
Figure 4:
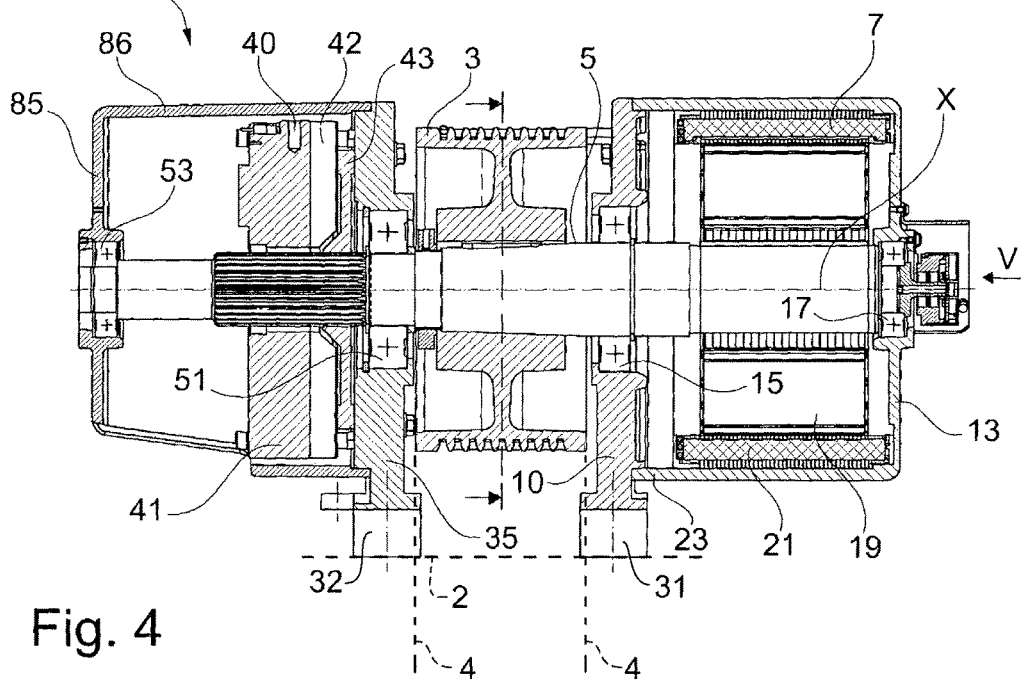
Figure 10:
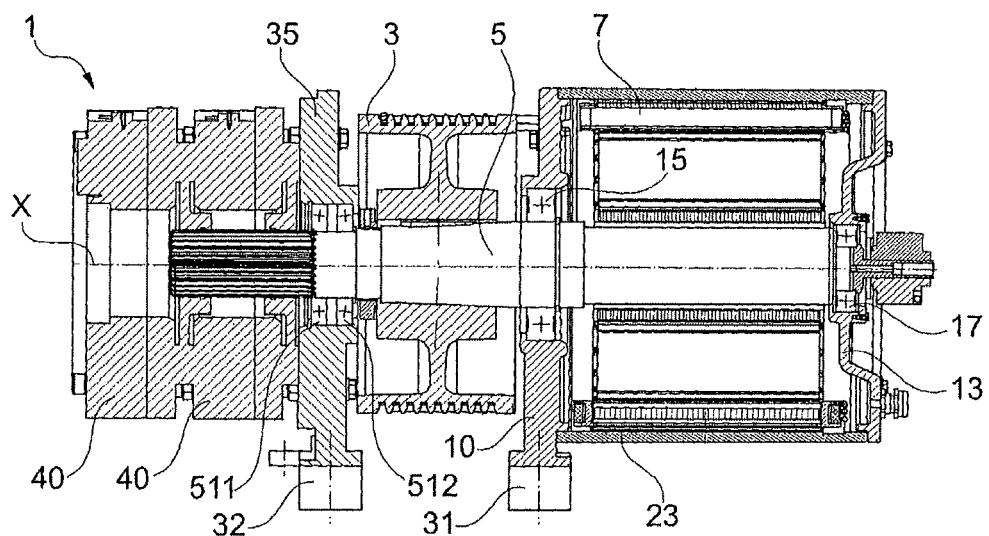
Figure 11:
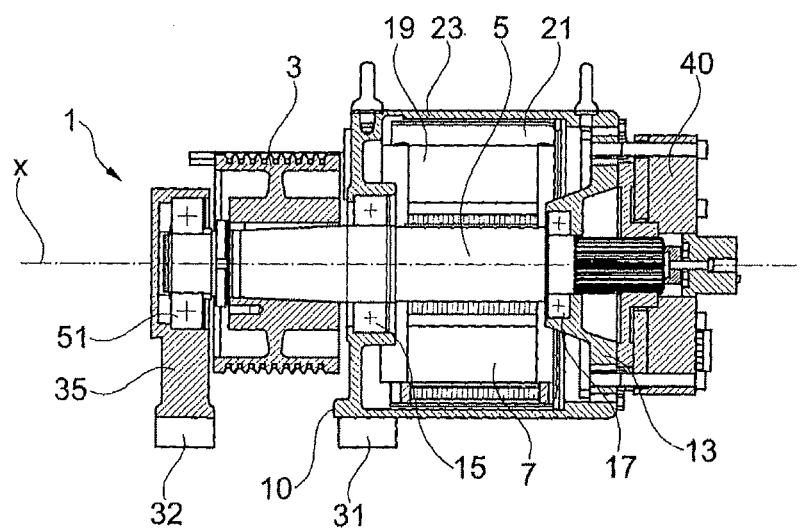

The invention will be better understood on reading the following description of one nonlimiting embodiment thereof and examining the appended drawings, in which:

FIGS. 1 and 2 represent known machinery, respectively with an exterior pulley and a rigid central casing, FIG. 3 represents in perspective an example of machinery constructed in accordance with the invention, FIG. 4 is a diagrammatic longitudinal section of the machinery from FIG. 3, FIG. 5 is a front view in the direction of the arrow V in FIG. 3, FIG. 6 represents a damper stud on its own, in axial section, FIGS. 7 and 8 are views analogous to FIG. 4 of variants, FIG. 9 represents a construction detail of a variant damper element, and FIGS. 10 and 11 are views analogous to FIG. 4 of variants.

The machinery 1 in accordance with the invention represented in FIGS. 3 to 5 includes a pulley 3 mounted on a shaft 5 turning about a rotation axis X that is preferably horizontal.

The pulley 3 may be mounted on the shaft 5 by any appropriate known means, for example by shrinking, conical taper fit or splines and abutment.

The machinery 1 includes on one side of the pulley 3 a motor 7 including a first front bearing 10 supporting the motor 7 and a rear bearing 13 carrying respective front and rear rolling bearings 15 and 17, for example ball bearings.

The motor 7 also includes a rotor 19 and a stator 21, which is carried out by a casing 23 extending between the first front bearing 10 and the rear bearing 13.

The casing 23 and the rear bearing 13 may be made in one piece, as shown, or in the form of parts to be assembled, as shown in FIG. 8.

The rotor 19 may be of the permanent magnet type, notably with ferrite or rare earth magnets. The rotor may be of the flux concentration type or of the type with surface-mounted magnets. The stator may be of the distributed or concentrated winding type. The motor preferably has a three-phase winding.

The motor may drive a fan that is not represented in the drawings or be cooled by a fan driven independently of the rotation of the shaft.

The front bearing 10 is mounted on a base or common base 2 via damper elements 31.

The damper elements 31 are for example studs such as that represented in FIG. 6, including an elastomer block, for example made of rubber, to which are fixed two metal washers carrying a nut or a threaded stud.

Damper studs that may be suitable are commercially available from the company PAULSTRA under the trademark RADIALFLEX and allow working of the elastomer in axial compression and/or in radial shear.

The base may be produced with an opening for passing through cables or the belt, shown generically as 4, connected to the lift car. Bolts and/or nuts that are not represented may be used for fixing the first front bearing 10 to the base, these bolts being fixed to the damper studs 31, which thus support the weight of the motor.

The machinery 1 includes, on the side opposite the motor, a second front bearing 35 supporting one or optionally more brakes 40.

Each brake 40, of the axial type known in itself, includes a yoke 41 housing an electromagnet that is not represented in the drawings for moving when energized an armature 42 carrying a brake lining. The armature is loaded by springs to bear against a disk 43 turning with the shaft 5.

The brake or brakes 40 are for example of the lack of current type, i.e. they lock rotation of the shaft when not energized.

The second front bearing 35 carries a rolling bearing 51 and rests on the base via damper elements 32.

A second rolling bearing 53 may be carried by a bearing 85 that may be made in one piece with a protective casing 86 of the brake or brakes 40.

The damper elements 32 are preferably identical to the damper studs 31, as shown here.

The machinery is advantageously equipped with a balance 34 for determining the torque exerted on the pulley when the motor is stopped. This can make it possible to start the motor without jerking, as indicated above.

The balance 34 is an inductive sensor, for example, preferably of the proportional output type, fixed to the base of the bearing 10 near the edge farthest away from the median longitudinal plane M. This sensor may measure its distance from the support base, which is representative of the state of deformation of the damper element or elements 31 and 32.

In the variant shown in FIG. 7, the machinery 1 includes two brakes 40.

In the FIG. 8 variant, the rear bearing 13 is attached to the casing 29. The second front bearing 35 supporting the brake or brakes is adapted to receive a two-row rolling bearing 51.

In the variant shown in FIG. 10, the second front bearing 35 includes two separate rolling bearings 511 and 512.

In a variant that is not shown, the machinery includes only one bearing on the motor side, namely the first front bearing 10, in which case the rolling bearing 15 can be of the two-row type, or the first bearing may include two separate rolling bearings.

In the variant shown in FIG. 11, the brake or, optionally, brakes are supported by the rear bearing 13.

The second front bearing 32 includes a single-row rolling bearing 51.

There is shown in FIG. 9 a variant damper element, for example for the first front bearing 10 as shown, it being understood that this also applies to the second bearing 35.

The damper element includes two elastomer shoes 31a and 31b. The first 31a is disposed between the bearing 10 and the base S receiving the machinery. The second 31b is disposed between the base S and a washer 101 retained by a screw 102 screwed into the bearing 10. The shoe 31a may take the form of a soleplate in contact with the whole of the lower face of the bearing 10. The shoe 31b may be staggered, in order to be centred in the hole in the base S for the screw 102 to pass through.

Of course, numerous modifications may be made to the examples shown without departing from the scope of the present invention.

For example, the number and the nature of the brakes may be modified. Calliper brakes may be used, for example, instead of disk brakes.

The casing of the motor may be produced, for example machined or cast, in one piece with one and/or the other of the bearings.

The invention claimed is:

1. Electrical machinery for driving a pulley, including:
   a shaft on which the pulley is mounted,
   a motor for driving the shaft,
   one or more brakes,
   a first front bearing supporting the motor, disposed on one side of the pulley, between the pulley and the motor, the first front bearing carrying a front rolling bearing and supported by one or more damper elements, and
   a second front bearing, disposed on an opposite side of the pulley, carrying at least one rolling bearing and supported by one or more damper elements,
   wherein there is no rigid connection between the first front bearing supporting the motor, and the second front bearing.

2. Machinery according to claim 1, wherein the motor includes a rear bearing carrying a rear rolling bearing.

3. Machinery according to claim 2, wherein the one or more brakes is supported by the rear bearing.

4. Machinery according to claim 1, wherein the one or more brakes is supported by the second front bearing.

5. Machinery according to claim 1, wherein all the brakes are disposed on the same side of the second front bearing.

6. Machinery according to claim 1, including a plurality of brakes.

7. Machinery according to claim 1, wherein the second front bearing carries a rolling bearing of a two-row type.

8. Machinery according to claim 1, wherein the second front bearing carries a rolling bearing of a single-row type.

9. Machinery according to claim 1, wherein the second front bearing carries two separate rolling bearings.

10. Machinery according to claim 1, including a balance disposed so as to measure a displacement of the machinery induced by a load weighing down the damper element or elements.

11. Machinery according to claim 1, having no casing around the pulley.

12. Machinery according to claim 1, wherein the first front bearing supports the motor and the second front bearing rests on a common base.

13. Machinery according to claim 1, wherein the one or more damper elements is constituted by studs including an elastomer block.

14. Method of driving a lift, using the machinery according to claim 1, wherein the pulley drives cables or a belt connected to a lift car.

* * * * *